Dec. 13, 1960  M. J. SMITH  2,963,781
JIGS, JIG STOCK AND PROCESS OF MAKING SAME
Filed April 23, 1958
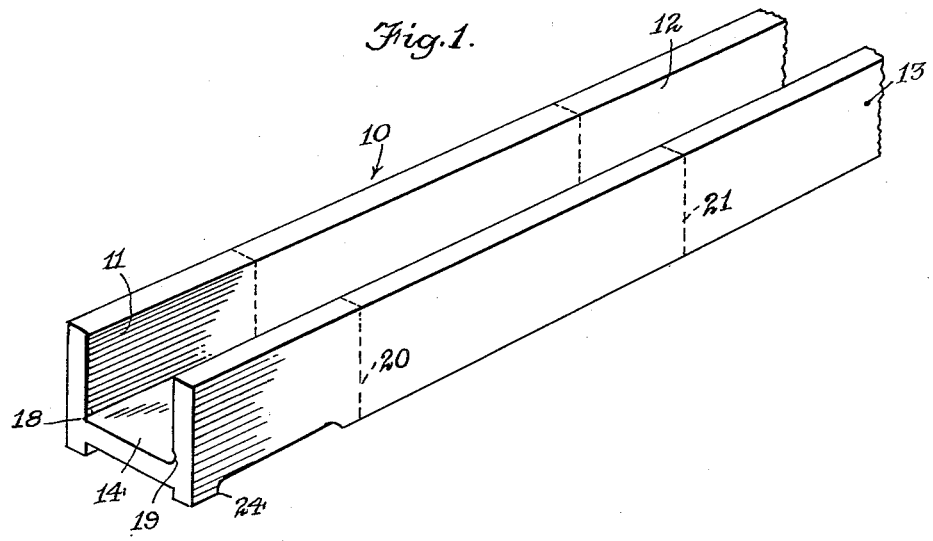
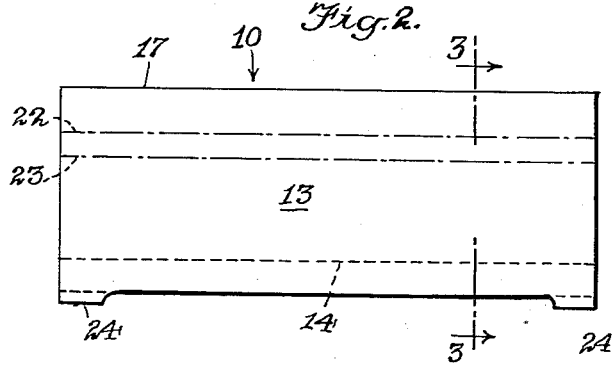 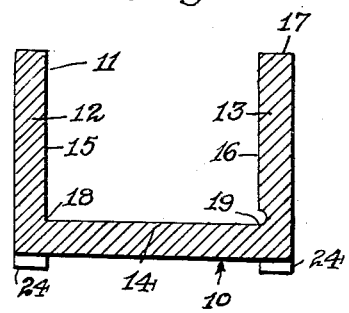
INVENTOR
Michael J. Smith
By Sylvester J. Liddy
Arthur L. Nathanson
ATTORNEYS

United States Patent Office 2,963,781
Patented Dec. 13, 1960

2,963,781

JIGS, JIG STOCK AND PROCESS OF MAKING SAME

Michael J. Smith, 191 Bay Ave., Glen Ridge, N.J.

Filed Apr. 23, 1958, Ser. No. 732,763

6 Claims. (Cl. 29—183)

This invention relates to the art concerned with holding work parts during grinding, milling and other operations, said art including devices commonly known as jig and fixture bodies, and more particularly to such devices and the stock and process for constructing the same.

Heretofore, in producing jig and fixture bodies the customary procedure was to first design and draw the particular jig or fixture body desired, such body commonly consisting of two side plates and a bottom or base plate. The screws, dowels, jig feet, et cetera, were shown in these drawings, which then had to be detailed. Thereafter the drawings were forwarded to the tool maker's department where the jig or fixture body was made from sheet metal plates or the like, which were screwed or doweled together. Accurate and detailed machining of the three plates, the jig feet and other parts, was, of necessity, required. Obviously this process was extremely time-consuming and expensive, for each separate part first had to be shown on the drawing, then separately made according to detailed specifications and thereafter secured together, all by the tool maker. The machining operations, requiring appreciable set-up time and great care, were also laborious and costly. In addition, to produce jig and fixture bodies of different sizes it was necessary to repeat the process set forth above for each size. For example, for 7500 different sizes, 7500 jig bodies had to be made as above, thus multiplying the time and expense-consuming aspects of this prior method of production.

The above drawbacks and disadvantages of this prior procedure and art are obviated by the present invention, and one object of the invention is to provide a novel and improved stock from which jig and fixture bodies can be quickly and economically made.

Another object of the present invention is to provide an improved stock for the making of jig and fixture bodies, by the use of which there are not required detailed drawings, detailed machining, et cetera, for each jig or fixture body.

A still further object of the present invention is to provide an improved stock as above set forth, from which jig and fixture bodies of a large variety of sizes may be inexpensively produced.

An additional object of the invention is to provide an improved, structurally rigid, one-piece jig or fixture body which does not have relatively large components subject to loosening, misalignment or malfunctioning, and which has permanently square and flat surfaces not likely to warp or spring out of shape, thereby to insure correct placement and anchorage of the work at all times.

Yet another object of the invention is to provide an improved jig and fixture body in accordance with the foregoing, which is rugged and sturdy in its construction, while at the same time being constituted of inexpensive, low-cost material.

A still further object of the invention is to provide a novel and unique process for making jig and fixture bodies, and for making the stock therefor, having advantages as above set forth.

The above and other objects and advantages are set forth in greater detail in the following description as illustrated by the drawings.

In the drawings:

Figure 1 is a perspective view of the stock for forming jig and fixture bodies;

Fig. 2 is a side view of the stock for forming jig and fixture bodies; and

Fig. 3 is a section taken along the line 3—3 of Fig. 2.

Referring to the drawings, there is shown a member 10 which constitutes a unique stock from which jig and fixture bodies are made. The stock 10 comprises an elongate cast, channel-shaped member 11 having two sides 12 and 13 and a bottom or base 14.

In the art of manufacturing jig and fixture bodies as presently practiced, both of the sides and the bottom or base comprise separate pieces which, after being carefully cut from plates according to specific dimensions for each jig or fixture body, are secured together by means of screws or screws and dowels.

According to the present invention, however, the channel-shaped member 10 is made of one piece and of a metal casting. It is to be noted that there are no screws, dowels, et cetera, securing any separate pieces together, since in fact there are no separate pieces or components.

The method or process of producing the stock of my invention, and of producing jig and fixture bodies in accordance with the invention, is to form the channel-shaped member, from which the jig and fixture bodies are ultimately obtained, of a metal casting 10, which preferably is of inexpensive yet strong alloy cast iron. In order to produce this casting a one-piece channel-shaped pattern is made of any desired length and width and having side walls of any desired height. The pattern, which is very inexpensive to make, is thereafter pressed into casting sand. The sand is then hammer-packed or otherwise pressed around the pattern and thereafter the pattern itself is removed from the sand, leaving its impression therein to form a mold. Molten casting metal, as for example, molten alloy cast iron, is poured into the mold and allowed to cool. It will be understood that the metal will conform to the shape of the mold and when cooled, it is removed from the sand forming the casting which is the stock 10 comprising the jig or fixture body according to the present invention.

The alloy cast iron may be chosen for strength and resistance to wear, and may contain from 2.80 to 3.40 total carbon, from 0.40 to 0.83 combined carbon, from 0.50 to 0.75 manganese and from 2 to 2.35 silicon. In addition, one or more alloying elements such as chromium, copper, molybdenum and nickel may be used.

It will be readily understood that the casting or stock 10 may be made of any desired predetermined length or width and that the side walls may be of any desired predetermined height, and may extend below the bottom 14 a short distance to constitute a pair or more parallel base surfaces.

The channel-shaped member 10 after being cast is then reheated and permitted to cool very slowly or allowed to age in order to "normalize" the stock itself. This process eliminates any danger of the stock springing out of true during later machining and/or subsequent use of the jig or fixture body as might occur without this "normalizing" process. Obviously strains may be caused by the cooling of certain parts of the stock 10 before other parts thereof during the original casting operation as above set forth. However, as the stock is "normalized" as described, these strains are removed.

Thereafter the inner faces 15 and 16 of the sides 12 and 13 respectively and the upper and lower edges 17 and 18 of the sides are machined perfectly parallel and square according to their disposition as shown. The lower inside corners 18 of the stock may, if desired, be provided with grooves 19 for the purpose of facilitating the machining and/or butting square pieces into the corner.

The stock 10, as above set forth, is made of a predetermined length and width with the side walls 12 and 13 of predetermined height. From this stock a number of jig or fixture bodies of various shorter lengths may be obtained simply by cutting desired portions from the stock, as for example, along the line 20 or the line 21 as shown in Fig. 1. In addition, jig or fixture bodies of various heights may be obtained simply by cutting the side walls, for example, along the line 22 or the line 23, as shown in Fig. 2. I have found that by using a stock as above provided by the invention for jig and fixture bodies, I can produce a minimum of 7500 different sized jig or fixture bodies from only 22 different stocks. Obviously the labor time and expense saved over existing methods, wherein 7500 different designs, drawings, et cetera, are required, is enormous.

The stock 10 and all jig and fixture bodies which are cut from the stock are thus characterized by being annealed and normalized as to strains, by being free of warping, and more than normally resistant to fracture under static stress due to being fastened to bed plates with work pieces attached to the bodies, or dynamic stress due to punch press or milling machine or the like operations being done on the work pieces. The stock and bodies fully retain their initial accuracy, and the bodies are reliable at all times in preventing shifting of the work pieces, when properly set up.

In many operations it is desired to provide the jig or fixture body with legs in order that refuse, et cetera, may be cleaned out from under the body itself. The stock of my invention may be, of course, provided with legs 24, simply by cutting out portions of the stock to provide the legs, as shown in the drawing.

The time and expense consumed in producing jig and fixture bodies by present methods has long been a hardship in the art. My invention in which a standard stock is provided for producing jig and fixture bodies of a multitude of sizes without requiring the detailed drawings, machining, et cetera, and from which strains are removed, overcomes the laborious time-consuming and expensive aspects of producing jig and fixture bodies, and the inaccuracies and other faults thereof, such as misalignment, looseness, and the like. In most instances jig and fixture bodies themselves made by present methods are produced of stainless steel or other expensive metals. Obviously a casting made of, for example, inexpensive alloy cast iron, reduces the expense enormously in this respect.

While I have described my invention in detail, it is to be understood that variations and modifications may be made by those skilled in the art without departing from the spirit of the invention or the scope of the appended claims.

I claim:

1. Elongate rigid cast, normalized and finish-machined metal fixture stock adapted to be cut into shorter lengths for forming a plurality of rigid individual work-holding jig and fixture bodies each having a plurality of sets of spaced, parallel accurately machined wall and edge surfaces, comprising a rigid and inflexible, elongate member having a cross section of deep channel shape, said member being formed as a metal casting and having a relatively thick bottom wall and relatively thick opposite side walls, the inner opposite surfaces of the side walls being finish machined flat and parallel, and the inner surface of the bottom wall being finish machined flat and perpendicular to the finish machined surfaces of the side walls, the upper and lower edges of both of the side walls being machined flat and parallel with each other and with the said bottom inner surface and making sharp edges at and right angles with the inner opposite surfaces of the side walls, said channel-shaped member being annealed and normalized as to strains, free of warping, and more than normally resistant to fracture under static and dynamic stress.

2. Elongate rigid cast, normalized and finish-machined metal fixture stock adapted to be cut into shorter lengths for forming a plurality of rigid individual work-holding jig and fixture bodies each having a plurality of sets of spaced parallel accurately machined wall and edge surfaces, comprising a rigid and inflexible, elongate member having a cross section of double or back-to-back channel shape constituted of a deep channel and a shallow channel, said member being formed as a metal casting and having a relatively thick bottom wall and relatively thick opposite side walls, one pair of corresponding sides of the member constituting the deep channel being of substantially greater depth than the other, the length of said member being a relatively large multiple of the depth of said one pair of sides, the inner opposite surfaces of the side walls being finish machined flat and parallel, and the inner surface of the bottom wall being finish machined flat and perpendicular to the finish machined surfaces of the side walls, the upper and lower edges of the pairs of sides respectively being finish machined flat and parallel with each other and with the said bottom inner surface and the finish-machined edges of the said one pair of sides making sharp edges with the inner opposite surfaces of the side walls, said channel-shaped member being annealed and normalized as to strains, free of warping, and more than normally resistant to fracture under static and dynamic stress.

3. A rigid, cast metal, normalized and finish-machined jig and fixture body comprising a rigid and inflexible channel-shaped member formed as a metal casting and having a relatively thick bottom wall and relatively thick opposite side walls, the inner opposite surfaces of the side walls being finish machined flat and parallel, and the inner surface of the bottom wall being finish machined flat and perpendicular to the finish machined surfaces of the side walls, the upper and lower edges of the side walls being finish machined flat and parallel with each other and with the said bottom inner surface, said channel-shaped member being annealed and normalized as to strains, free of warping, and more than normally resistant to fracture under static and dynamic stress.

4. A rigid cast metal, normalized and finish-machined jig and fixture body comprising a rigid and inflexible double or back-to-back channel-shaped member formed as a metal casting and having a relatively thick bottom wall and relatively thick opposite side walls, one pair of corresponding sides of the member constituting a deep channel being of substantially greater depth than the other pair of corresponding sides, the length of said member being a relatively large multiple of the depth of said one pair of sides, the inner opposite surfaces of the side walls being finish machined flat and parallel, and the inner surface of the bottom wall being finish machined flat and perpendicular to the finish machined surfaces of the side walls, the upper and lower edges of the pairs of sides respectively being finish machined flat and parallel with each other and with the said bottom inner surface and the finish-machined edges of the said one pair of sides making sharp edges with the inner opposite surfaces of the side walls, said channel-shaped member being annealed and normalized as to strains, free of warping, and more than normally resistant to fracture under static and dynamic stress.

5. The process of making jig and fixture body blanks, which includes the steps of casting in metal a rigid and inflexible channel-shaped elongate member having relatively thick walls, annealing and normalizing said member to remove strains, finish machining flat and parallel the opposite inner surfaces of the side walls of the member, finish machining flat the bottom inner wall of the member to be perpendicular to the side walls, finish machining flat and parallel with each other and with the said bottom inner surface the upper and lower edges of the side walls, and cutting said member into a plurality of short lengths having the same characteristics except for length and weight as the said member, said short lengths each constituting a blank for a jig and fixture body.

6. The process of making jig and fixture body blanks, which includes the steps of casting in metal a rigid and inflexible, double or back-to-back elongate channel-shaped member having relatively thick walls, annealing and normalizing said member to remove strains, finish machining flat and parallel the opposite inner surfaces of the side walls of the member, finish machining flat the bottom inner wall of the member to be perpendicular to the side walls, finish machining flat and parallel with each other and with the said bottom inner surface the upper and lower edges of the side walls, and cutting said member into a plurality of short lengths having the same characteristics except for length and weight as the said member, said short lengths each constituting a blank for a jig and fixture body.

References Cited in the file of this patent

UNITED STATES PATENTS

| | | |
|---|---|---|
| 2,267,563 | Holstien | Dec. 23, 1941 |
| 2,333,250 | Hegg | Nov. 2, 1943 |
| 2,455,135 | Nelson | Nov. 30, 1948 |

OTHER REFERENCES

Jigs & Fixtures, Colum & Haas, 2nd edition, copyright 1922, published by McGraw-Hill Book Co., pp. 9, 52–53, 65–68.